US012172573B2

(12) United States Patent
Hirohashi et al.

(10) Patent No.: US 12,172,573 B2
(45) Date of Patent: Dec. 24, 2024

(54) ILLUMINATION CONTROL DEVICE

(71) Applicant: HONDA MOTOR CO., LTD., Tokyo (JP)

(72) Inventors: Remi Hirohashi, Tokyo (JP); Jumpei Matsunaga, Tokyo (JP); Shuto Higashi, Tokyo (JP); Yoshikazu Matsuo, Tokyo (JP); Yuna Inamori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 403 days.

(21) Appl. No.: 17/699,605

(22) Filed: Mar. 21, 2022

(65) Prior Publication Data
US 2022/0305986 A1    Sep. 29, 2022

(30) Foreign Application Priority Data
Mar. 25, 2021 (JP) ................................ 2021-050973

(51) Int. Cl.
*B60Q 3/80* (2017.01)
*H05B 47/125* (2020.01)
*H05B 47/13* (2020.01)

(52) U.S. Cl.
CPC ............. *B60Q 3/80* (2017.02); *H05B 47/125* (2020.01); *H05B 47/13* (2020.01)

(58) Field of Classification Search
CPC ......... B60Q 3/80; H05B 47/13; H05B 47/125
See application file for complete search history.

(56) References Cited

U.S. PATENT DOCUMENTS

| | | | | |
|---|---|---|---|---|
| 2010/0014711 | A1* | 1/2010 | Camhi | B60K 35/00 382/104 |
| 2017/0270924 | A1* | 9/2017 | Fleurence | B60K 35/10 |
| 2019/0071010 | A1* | 3/2019 | Fleurence | B60Q 3/74 |
| 2020/0001783 | A1* | 1/2020 | Suzuki | G02B 6/0018 |
| 2020/0337139 | A1* | 10/2020 | Hiramatsu | H04N 23/20 |
| 2021/0206384 | A1* | 7/2021 | Nishiyama | G06F 3/017 |

FOREIGN PATENT DOCUMENTS

| | | |
|---|---|---|
| JP | 2008-81053 A | 4/2008 |
| JP | 2016091194 A * | 5/2016 |
| JP | 2017-171287 | 9/2017 |
| JP | 2017-185994 A | 10/2017 |
| WO | 2019/224905 A1 | 11/2019 |

OTHER PUBLICATIONS

Machine Translation of JP-2016091194-A. (Year: 2016).*
Japanese Office Action issued in the corresponding Japanese application dated May 28, 2024, Application No. 2021-050973; English machine translation included, 9 pages.

* cited by examiner

*Primary Examiner* — Alexander H Taningco
*Assistant Examiner* — Pedro C Fernandez
(74) *Attorney, Agent, or Firm* — Rankin, Hill & Clark LLP

(57) ABSTRACT

An illumination control device that controls an illumination device illuminating inside of a vehicle includes: an action detecting unit that detects an action pattern that is a body motion of a driver and/or a fellow passenger of the vehicle; and a determination unit that determines whether or not a current situation needs illumination control of the illumination device on the basis of the action pattern, and the illumination device is controlled on the basis of the determination of the determination unit.

14 Claims, 13 Drawing Sheets

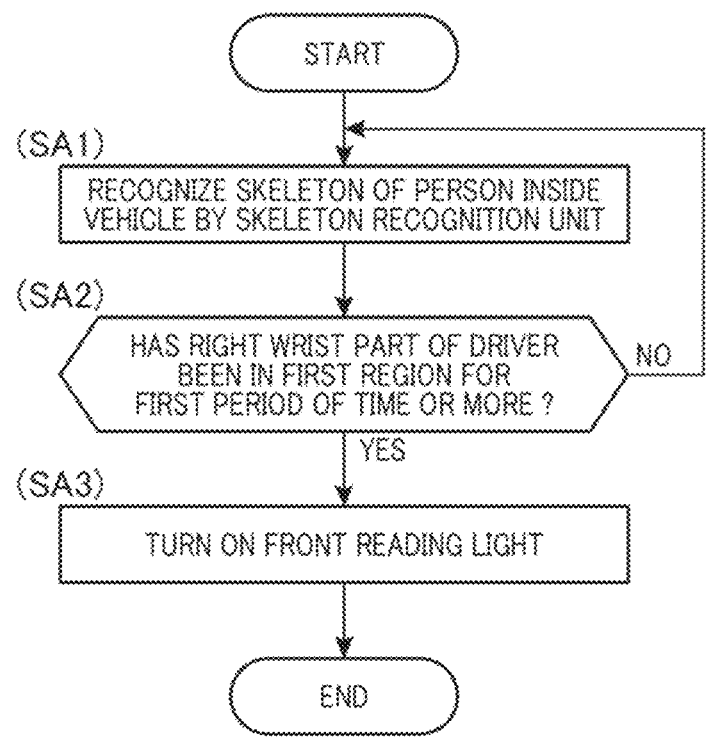

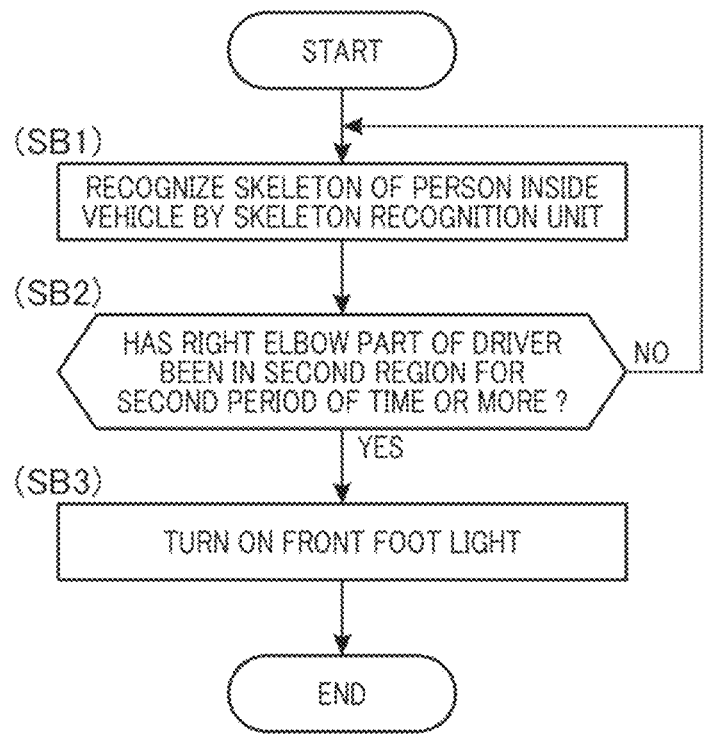

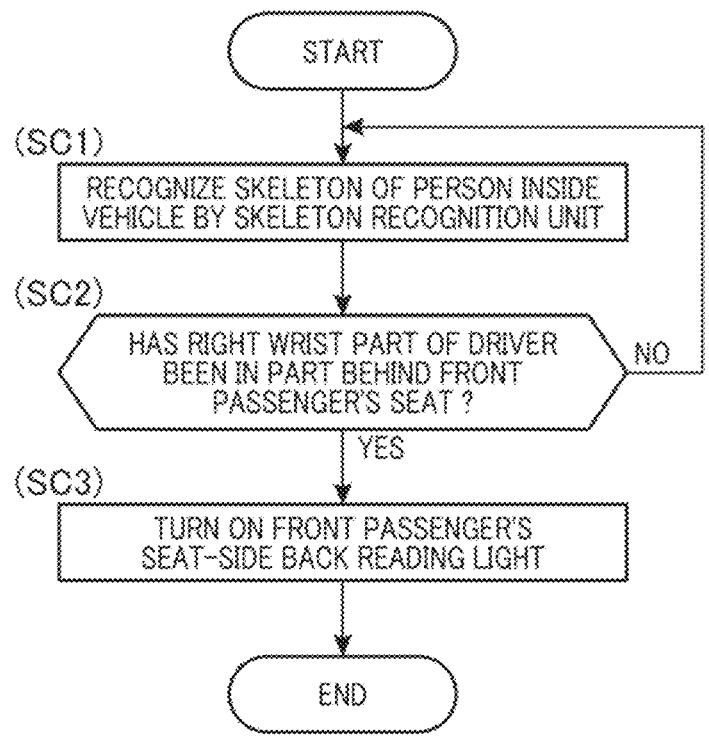

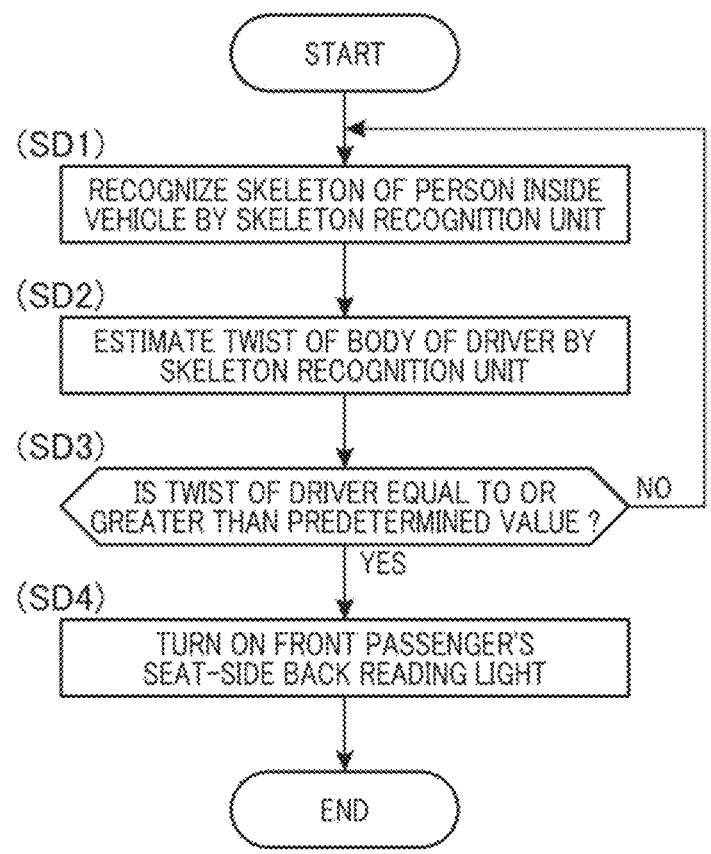

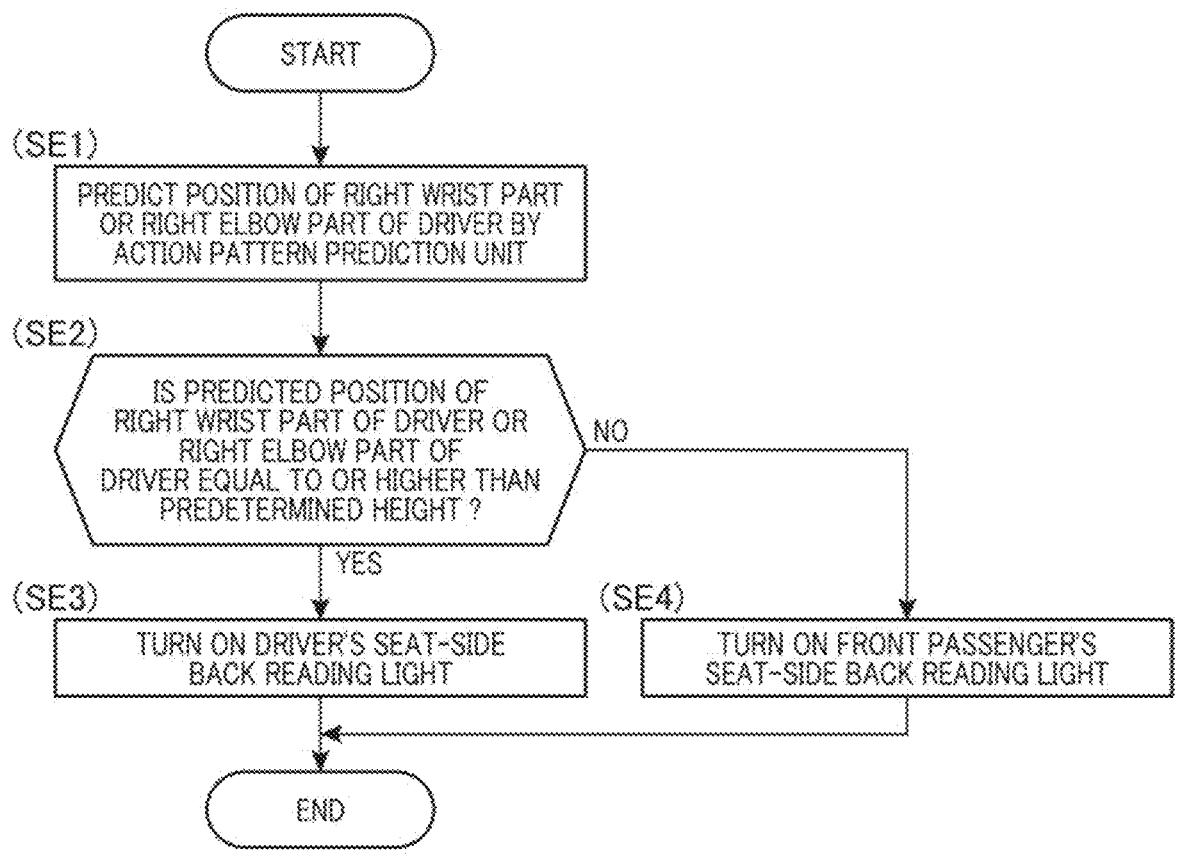

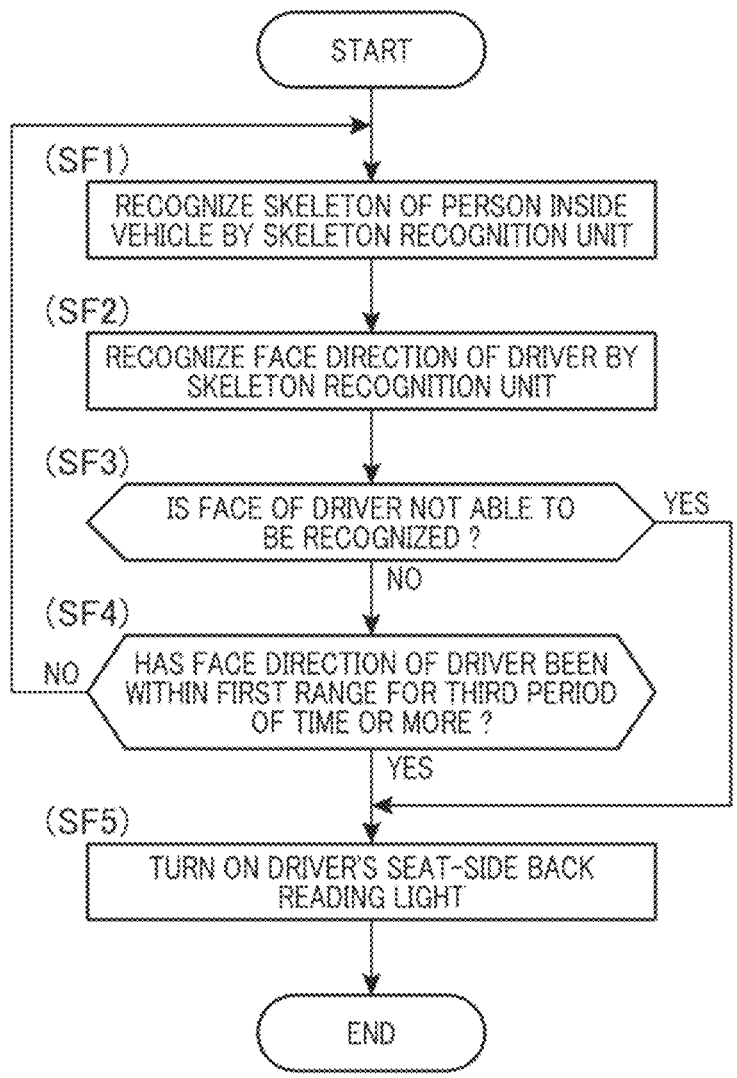

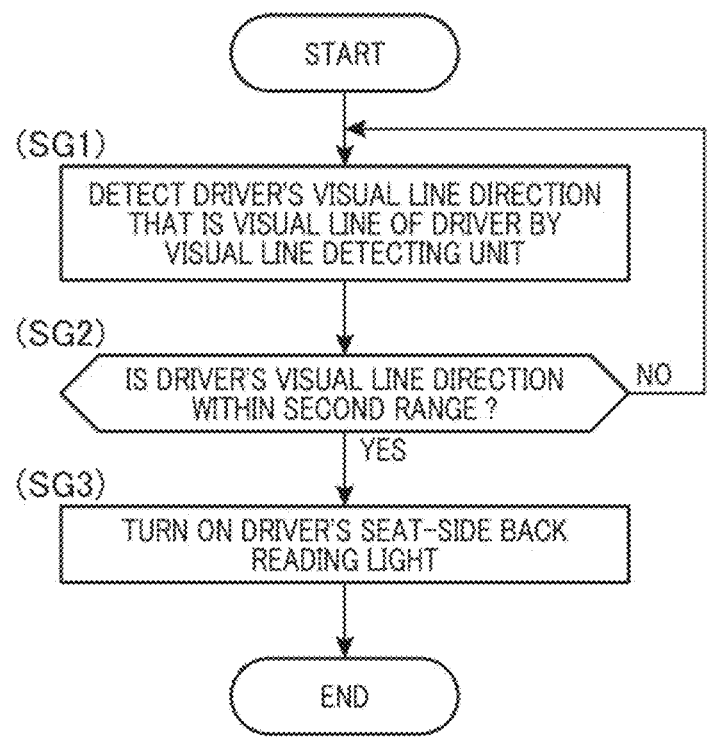

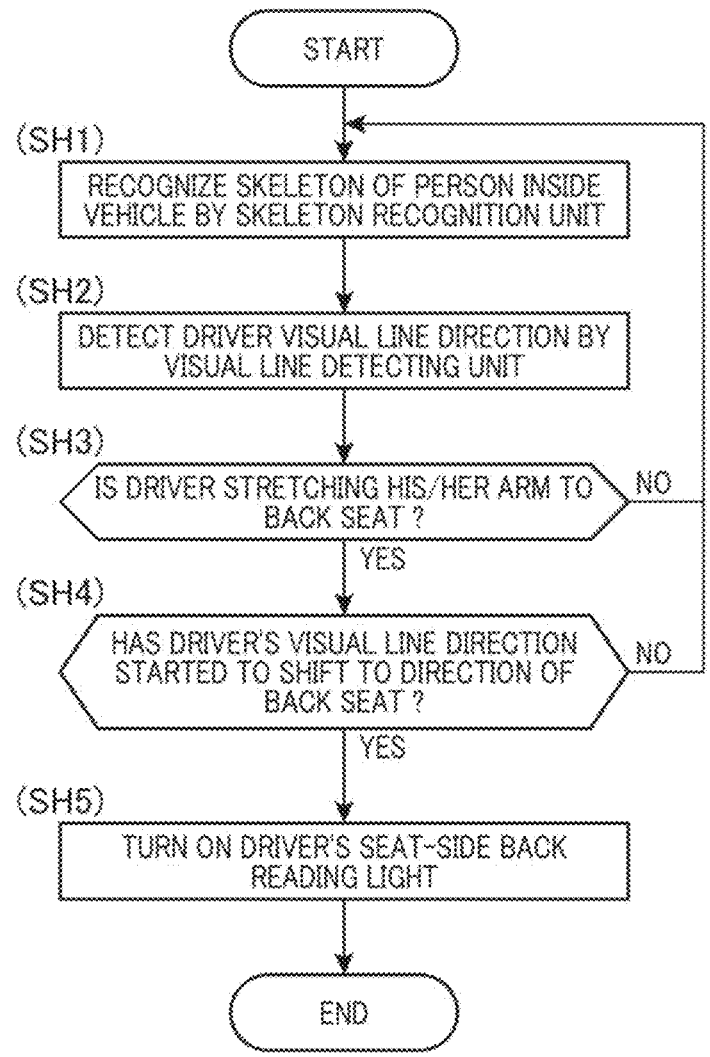

ILLUMINATION CONTROL DEVICE

INCORPORATION BY REFERENCE

The present application claims priority under 35 U.S.C. § 119 to Japanese Patent Application No. 2021-050973 filed on Mar. 25, 2021. The content of the application is incorporated herein by reference in its entirety.

BACKGROUND OF THE INVENTION

Field of the Invention

The present invention relates to an illumination control device that controls an illumination device inside a vehicle.

Description of the Related Art

In the related art, drivers who are looking for their baggage in vehicles are required to manually turn on indoor lights in a case in which the inside of the vehicles is dark, such as during night time, which requires time and efforts and is inconvenient. Some techniques of control devices that control illumination inside vehicles on the basis of voice or gestures of passengers of the vehicles have been disclosed until now (see Japanese Patent Laid-Open No. 2017-171287, for example).

However, Japanese Patent Laid-Open No. 2017-171287 does not specifically indicate what kinds of gestures are to be recognized and how the gestures are to be recognized to control an illumination device.

The present invention was made in view of the aforementioned circumstances, and an object thereof is to provide an illumination control device that controls an illumination device through image recognition of a driver's motion.

SUMMARY OF THE INVENTION

As an aspect to achieve the aforementioned object, there is provided an illumination control device that controls an illumination device illuminating inside of a vehicle, the illumination control device including: an action detecting unit that detects an action pattern that is a body motion of a driver and/or a fellow passenger of the vehicle; and a determination unit that determines, on the basis of the action pattern, whether or not a current situation needs illumination control of the illumination device, in which the illumination device is controlled on the basis of the determination of the determination unit.

The aforementioned illumination control device may be configured such that the illumination device is not turned on in a case in which the vehicle is moving at a speed that is equal to or greater than a predefined speed.

The aforementioned illumination control device may be configured such that the vehicle includes any of a front reading light provided at a front portion inside the vehicle, a front foot light provided at a level of feet at the front portion inside the vehicle, a driver's seat-side back reading light provided at a back passenger's seat on a side of a driver's seat inside the vehicle, and a front passenger's seat-side back reading light provided at the back passenger's seat on a side of a front passenger's seat inside the vehicle.

The aforementioned illumination control device may be configured such that the action detecting unit includes a skeleton recognition unit that recognizes a skeleton of a person.

The aforementioned illumination control device may be configured such that the action pattern is estimated on the basis of at least any one piece of position information of a shoulder part of the driver, an elbow part of the driver, a wrist part of the driver, a waist part of the driver, and a face part of the driver recognized by the skeleton recognition unit in a time-series manner.

The aforementioned illumination control device may be configured such that the determination unit determines to turn on the front reading light in a case in which the skeleton recognition unit detects that the wrist part of the driver has been in a first region located on an upper side near a center of the vehicle for a predetermined first period of time or more.

The aforementioned illumination control device may be configured such that the determination unit determines to turn on the front foot light in a case in which the skeleton recognition unit recognizes that the elbow part of the driver has been in a second region located on a lower side near a center of the vehicle for a predetermined second period of time or more.

The aforementioned illumination control device may be configured such that the determination unit determines to turn on the front passenger's seat-side back reading light in a case in which the skeleton recognition unit recognizes that the wrist part of the driver or the elbow part of the driver has moved to a part behind the front passenger's seat.

The aforementioned illumination control device may be configured such that the skeleton recognition unit estimates twist of a body of the driver from position information of the shoulder part of the driver and the waist part of the driver, and the determination unit determines, on the basis of the twist, whether or not a current situation needs illumination control of the illumination device.

The aforementioned illumination control device may be configured such that the determination unit determines to turn on the front passenger's seat-side back reading light in a case in which the twist is equal to or greater than a predetermined value.

The aforementioned illumination control device may be configured to further include: an action pattern prediction unit that predicts a future action pattern from the action pattern recognized by the skeleton recognition unit in a time-series manner.

The aforementioned illumination control device may be configured such that the determination unit determines to turn on the driver's seat-side back reading light in a case in which a position of the wrist part of the driver or the elbow part of the driver predicted by the action pattern prediction unit is equal to or higher than a predetermined height.

The aforementioned illumination control device may be configured such that the determination unit determines to turn on the front passenger's seat-side back reading light in a case in which a position of the wrist part of the driver or the elbow part of the driver predicted by the action pattern prediction unit is lower than a predetermined height.

The aforementioned illumination control device may be configured such that the skeleton recognition unit recognizes, from position information of a face part of the driver, a face direction that is a direction in which the face of the driver is directed, and the determination unit determines to turn on the driver's seat-side back reading light in a case in which the skeleton recognition unit recognizes that the face direction has been within a predetermined first range for a predetermined third period of time or more or in a case in which the skeleton recognition unit does not recognize the face of the driver.

The aforementioned illumination control device may be configured such that the action detecting unit includes a visual line detecting unit that detects a visual line of a person.

The aforementioned illumination control device may be configured such that the visual line detecting unit detects a driver's visual line direction that is a visual line direction of the driver, and the determination unit determines to turn on the driver's seat-side back reading light in a case in which the visual line detecting unit detects that the driver's visual line direction has been within a predetermined second range for a predetermined fourth period of time or more.

The aforementioned illumination control device may be configured such that the visual line detecting unit detects a driver's visual line direction that is a visual line direction of the driver, and the determination unit determines to turn on the front passenger's seat-side back reading light or the driver's seat-side back reading light at a timing when the driver's visual line direction starts to shift to a direction of the back passenger's seat in a case in which the skeleton recognition unit recognizes, from the action pattern, that the driver is stretching his/her arm to the back passenger's seat.

According to the aforementioned illumination control device, it is possible to execute control to turn on and off the illumination device in the vehicle in accordance with a sign and a visual line direction of the driver inside the vehicle. It is thus possible to improve comfort inside the vehicle.

BRIEF DESCRIPTION OF THE DRAWINGS

FIG. 6 is a flowchart for explaining operations of the illumination control device;

FIG. 7 is a flowchart for explaining operations of the illumination control device;

FIG. 8 is a flowchart for explaining operations of the illumination control device;

FIG. 9 is a flowchart for explaining operations of the illumination control device;

FIG. 10 is a flowchart for explaining operations of the illumination control device;

FIG. 11 is a flowchart for explaining operations of the illumination control device;

FIG. 12 is a flowchart for explaining operations of the illumination control device; and FIG. 13 is a flowchart for explaining operations of the illumination control device.

DETAILED DESCRIPTION OF THE PREFERRED EMBODIMENT

Hereinafter, an embodiment will be described in detail with reference to the drawings. However, unnecessarily detailed description may be omitted. For example, detailed description of matters that have already been known well or repeated description of substantially the same configurations may be omitted. This is for avoiding unnecessarily redundant explanation being given below and for facilitating understanding of those skilled in the art.

Note that the accompanying drawings and the following description will be provided to allow those skilled in the art to sufficiently understand the present disclosure, and these are not intended to limit the subject matter described in the claims.

[1. Configuration of Vehicle Including Illumination Control Device]

Figure 1:
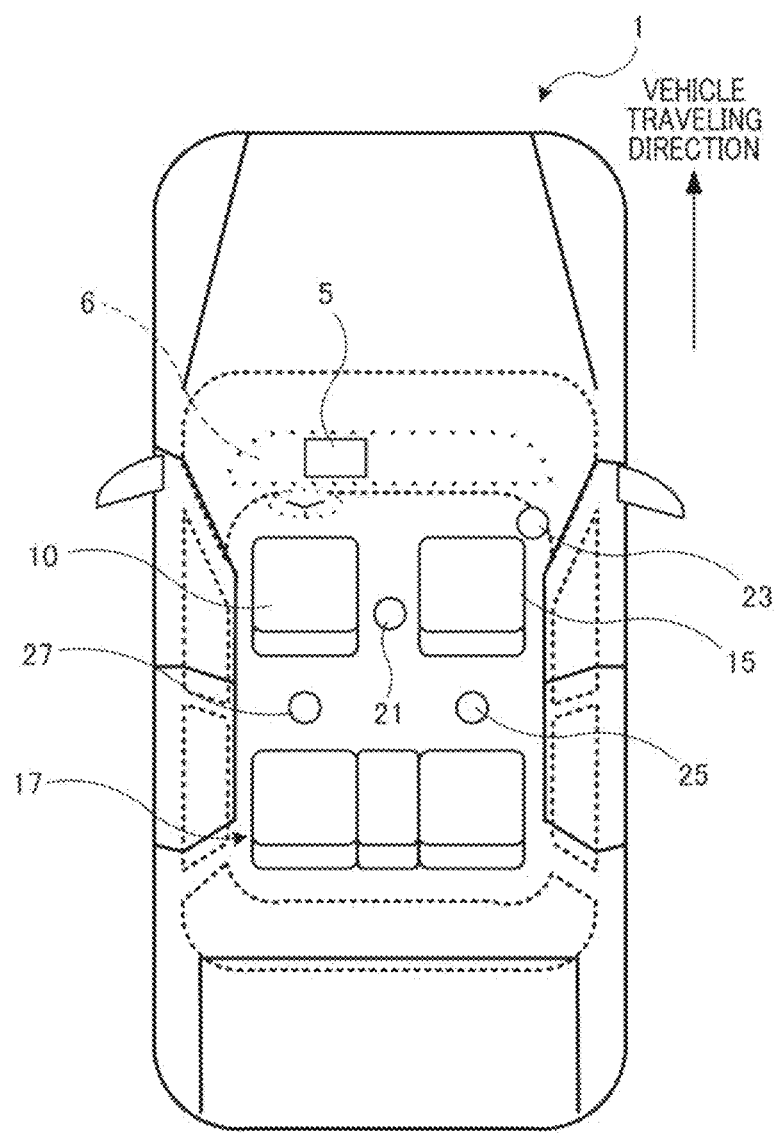
FIG. 1 is an explanatory diagram of a vehicle including an illumination control device according to the present embodiment.

An outline of a vehicle 1 including an illumination control device 5 that controls an illumination device 20 illuminating inside of the vehicle 1 will be described with reference to FIG. 1. In FIG. 1, the vehicle 1 includes a driver's seat 10 in which a driver is seated, a front passenger's seat 15 disposed next to the driver's seat 10, and a back passenger's seat 17 disposed on an opposite side in a vehicle traveling direction (the direction of the arrow in FIG. 1) relative to the driver's seat 10 and the front passenger's seat 15.

The illumination device 20 includes a front reading light 21 that illuminates a front portion inside the vehicle 1, a front foot light 23 that illuminates a level of feet at the front portion inside the vehicle 1, a front passenger's seat-side back reading light 25 that illuminates the back passenger's seat 17 on the side of the front passenger's seat 15 inside the vehicle 1, and a driver's seat-side back reading light 27 that illuminates the back passenger's seat 17 on the side of the driver's seat 10 inside the vehicle 1. The front foot light 23 may illuminate the lower side of the front passenger's seat 15 and may illuminate the lower side of the driver's seat 10 and the lower side of the back passenger's seat 17 at the same time. The front reading light 21 and the front passenger's seat-side back reading light 25, and the driver's seat-side back reading light 27 may be provided at a roof part of the vehicle 1. In addition, the front foot light 23 may be provided at a position from which the front foot light 23 can illuminate a lower floor of the front passenger's seat 15. Each of the front reading light 21, the front foot light 23, the front passenger's seat-side back reading light 25 and the driver's seat-side back reading light 27 may be a lamp, a light emitting element such as a light emitting diode (LED), or the like.

The illumination control device 5 that controls the illumination device 20 is disposed in a dashboard 6 provided below a front glass of the vehicle 1. The illumination control device 5 may be integrated with a display audio (DA) which is an electronic device that can cooperate with a mobile terminal such as a smartphone.

[2. Configuration of Illumination Control Device and Relationship Between Illumination Control Device and Other Devices]

Figure 2:
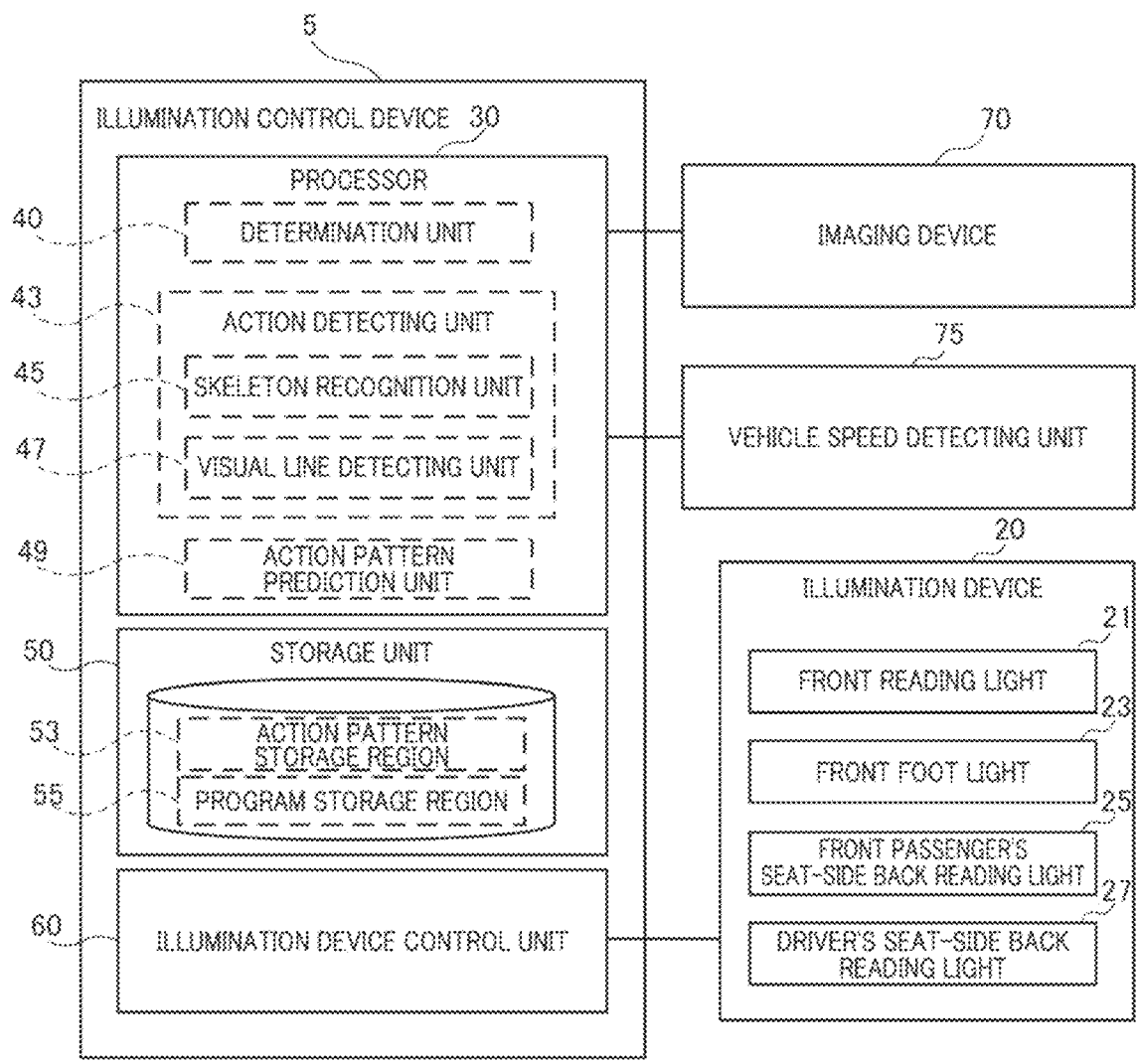
FIG. 2 is an explanatory diagram for explaining a relationship between the illumination control device and other devices.

A configuration of the illumination control device 5 and a relationship between the illumination control device 5 and other devices will be described with reference to FIG. 2.

The illumination control device 5 includes a processor 30 that performs information processing, a storage unit 50 that stores information, and an illumination device control unit 60 that performs control such as turning-on and turning-off of the illumination device 20. The illumination device control unit 60 has a processor (not illustrated) and a memory (not illustrated) that stores programs and various data, and controls the illumination device 20 by executing, by the processor, the programs stored in the memory. The illumination control device 5 includes an action detecting unit 43 that detects an action pattern which is a motion of a body of a driver 80 and/or a fellow passenger of the vehicle 1 and a determination unit 40 that determines, on the basis of the action pattern, whether or not a current situation needs illumination control of the illumination device 20, and controls the illumination device 20 on the basis of the determination of the determination unit 40. The illumination control is considered to include, for example, control to turn on and off the illumination device 20, control to increase and decrease illumination luminance, and control to change a color tone, specifically either a cold color or a warm color.

The action detecting unit 43 includes a skeleton recognition unit 45 that recognizes a skeleton of a person. In addition, action detecting unit 43 includes a visual line detecting unit 47 that detects a visual line of a person.

Here, the action pattern is estimated on the basis of any of position information of a shoulder part of the driver 80, an elbow part of the driver 80, a wrist part of the driver 80, a waist part of the driver 80, and a face part of the driver, for example, recognized by the skeleton recognition unit 45 in a time-series manner.

The action pattern includes a visual line direction of a person detected by the illumination control device 5.

The action detecting unit 43 includes the skeleton recognition unit 45 that recognizes a skeleton of a person and an action pattern prediction unit 49 that predicts a future action pattern from an action pattern recognized by the skeleton recognition unit 45 in a time-series manner. The illumination control device 5 includes an action pattern prediction unit 49 that predicts a future action pattern from an action pattern recognized by the visual line detecting unit 47 in a time-series manner.

The illumination control device 5 is connected to a vehicle speed detecting unit (sensor) 75 that detects the speed of the vehicle 1, an imaging device 70 that acquires image information of the interior of the vehicle 1, and the illumination device 20. The imaging device 70 may be included in the illumination control device 5.

The illumination control device 5 has a function of not turning on the illumination device in a case in which the vehicle 1 is moving at a speed that is equal to or greater than a predefined speed. It is also conceived that the illumination control device 5 does not turn on the front reading light 21 and the front foot light 23 in a case in which the vehicle 1 is moving at a speed that is equal to or greater than the predefined speed and also there is a fellow passenger other than the driver 80, for example, the fellow passenger is seated in the front passenger's seat 15. It is also conceived that the illumination control device 5 does not turn on the front passenger's seat-side back reading light 25 and the driver's seat-side back reading light 27 in a case in which a fellow passenger is seated in the back passenger's seat 17, for example.

The imaging device 70 may be a near-infrared camera that can sense light in an infrared region or may be a laser imaging detection and ranging (LIDAR). In addition, the imaging device 70 may be any device capable of detecting motions of a passenger and may be, for example, an ultrasonic sensor.

Note that the illumination control device 5 according to the present disclosure may be any illumination control device capable of controlling the device in the present disclosure. It is possible to execute various kinds of processing by causing the processor 30 to read a program from a program storage region 55 in the storage unit 50 that stores the program therein and causing the processor 30 to execute the program. Therefore, it is possible to change content of processing by changing the program stored in the storage unit 50 and thereby to enhance a degree of freedom in changing content of control. The processor is, for example, a central processing unit (CPU), or a micro-processing unit (MPU). A storage medium of the storage unit 50 is, for example, a hard disc, or a flash memory and an optical disc. A wired logic capable of rewriting the program may be used as the illumination control device 5. Utilization of the wired logic as the illumination control device 5 is advantageous for improving a processing speed. The wired logic is, for example, an application specific integrated circuit (ASIC). The illumination control device 5 may be realized by a combination of the processor 30 and the wired logic. If the illumination control device 5 is realized by the combination of the processor and the wired logic, then it is possible to improve a processing speed while enhancing a degree of freedom in designing software. In addition, the illumination control device 5 and a circuit that has a function different from that of the illumination control device 5 may be constituted by a single semiconductor element. The circuit that has a different function is, for example, an A/D-D/A converter circuit. Also, the illumination control device 5 may be constituted by a single semiconductor element or may be constituted by a plurality of semiconductor elements. In a case of configuration with a plurality of semiconductor elements, each control described in the claims may be realized by mutually different semiconductor elements. Moreover, the illumination control device 5 may be constituted by a configuration including a semiconductor element and a passive component such as a resistance or a capacitor.

Specifically, the processor 30 realizes the functions of the determination unit 40, the action detecting unit 43, the skeleton recognition unit 45, the action pattern prediction unit 49, and the visual line detecting unit 47 using the program and data stored in the action pattern storage region 53, the program storage region 55, and the like in the storage unit 50.

Note that the processor 30 and the storage unit 50 may be provided inside the vehicle 1 or may be provided in an information processing device connected to the vehicle 1 through wireless communication and disposed outside the vehicle 1, which is so-called an external server (computer). It is a matter of course that a mobile terminal that the passenger of the vehicle 1 has may realize the functions of the illumination control device 5, the imaging device 70, the illumination device control unit 60, and the like and control the illumination device 20.

[3. Aspect of Image Recognition]

Figure 3:
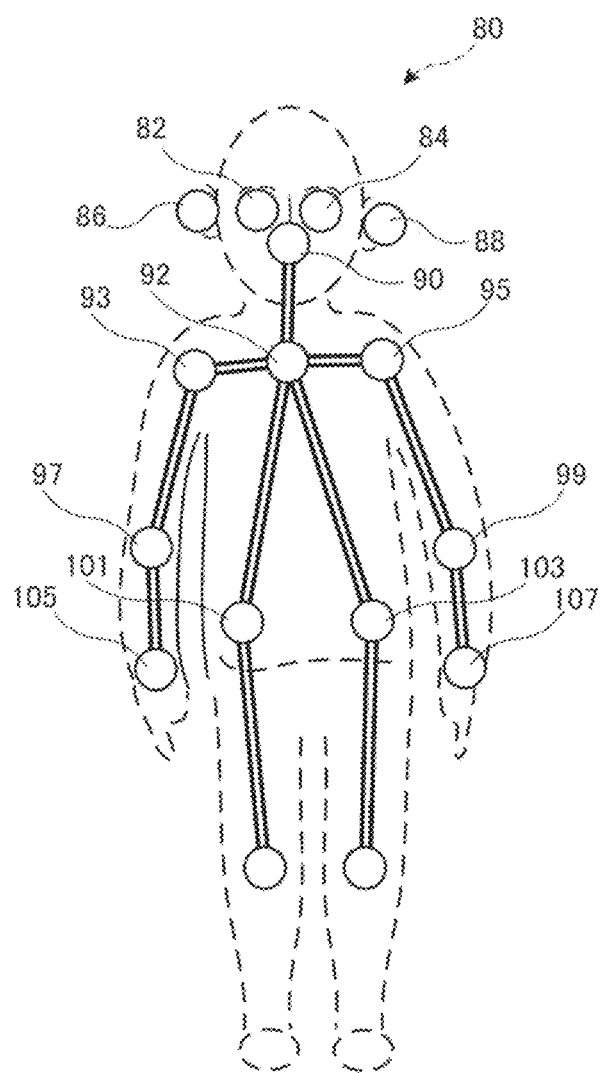
FIG. 3 is an explanatory diagram for explaining an aspect of image recognition of a person.

An aspect of image recognition performed by the illumination control device 5 will be described with reference to FIG. 3.

The image recognition means that an image is analyzed to recognize that the image means. Specifically, the image recognition is realized by a program for controlling the illumination device 20 by detecting and recognizing, from an image, body motions, signs, changes in visual line direction, and the like of a passenger of the vehicle 1, representative of which is the driver 80, in the specification.

In recent years, image recognition has rapidly progressed, and it has become easier to visualize motions of persons in images by a method using deep learning, in particular. For example, even a program called OpenPose, which has been released to the public, enables detection of positions of skeletons and joint positions of persons and enables recognition of motions of arms, shoulders, and the like. FIG. 3 is a schematic view of a result of recognizing a skeleton of a person. Joints that are feature points are illustrated with white circles, and motions of the skeleton between joints are recognized. Specifically, the skeleton recognition unit 45 of the illumination control device 5 recognizes positions of body parts, for example, a right eye 82, a left eye 84, a right ear 86, a left ear 88, a nose part 90, a neck part 92, a right shoulder part 93, a left shoulder part 95, a right elbow part 97, a left elbow part 99, a right waist part 101, a left waist part 103, a right wrist part 105, and a left wrist part 107 of the driver 80. Then, the motions of the parts are recognized in a time-series manner in accordance with motions and signs of the driver. Note that the recognition described here includes an operation in which the illumination control device 5 acquires position information of the parts and brings the position information into an available state.

Figure 4:
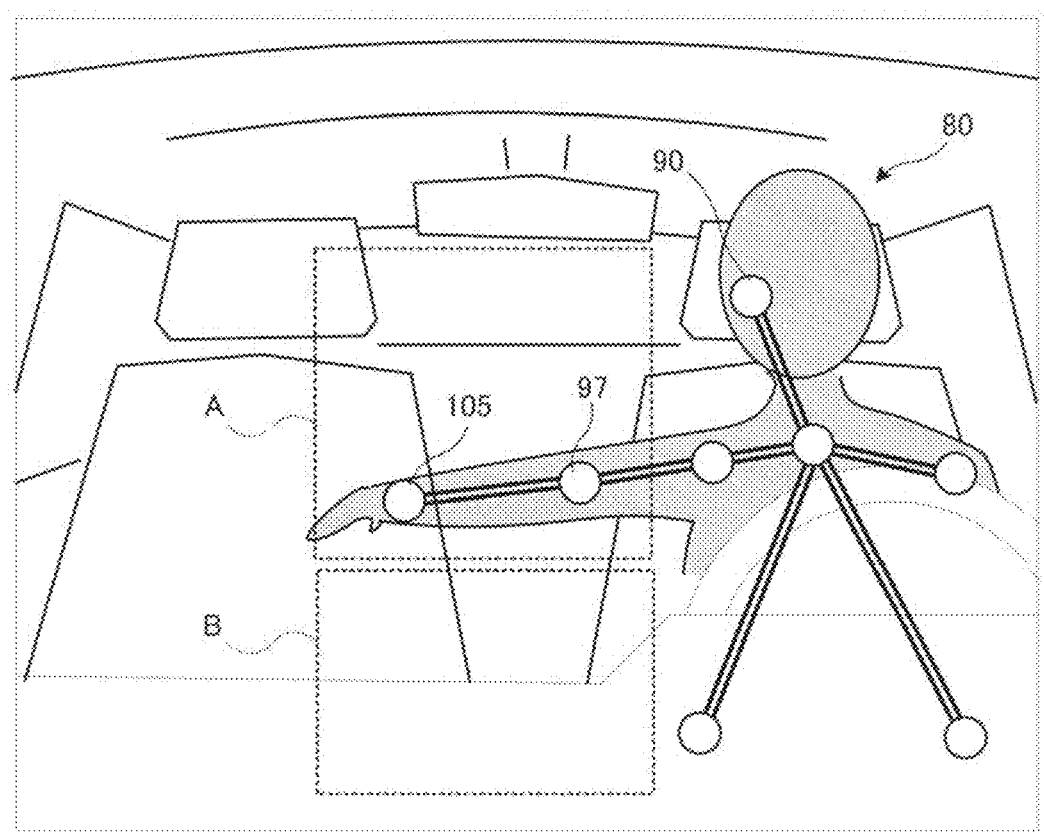
FIG. 4 is an example of image recognition of a driver's sign of stretching his/her arm on a side of a front passenger's seat.

FIG. 4 illustrates an example in which the skeleton recognition unit 45 of the illumination control device 5 recognizes a sign of stretching a right hand and searching around an upper part of the front passenger's seat 15 of the driver 80 seated in the driver's seat 10 using image recognition when the driver 80 performs the sign. Note that FIGS. 4 and 5 are schematic views when the inside of the vehicle 1 in a state where the driver 80 is seated in the driver's seat 10 is seen from the side of the front glass of the vehicle 1.

In a case in which the skeleton recognition unit 45 recognizes that the right wrist part 105 of the driver 80 has stayed in a predefined first region A for a predetermined first period of time, the determination unit 40 determines to turn on the front reading light 21, and the illumination device control unit 60 performs control to turn on the front reading light 21 included in the illumination device 20. The first region A may be defined as a predetermined region in an image captured by the imaging device 70. The first period of time may be set to, for example, 2 seconds.

Figure 5:
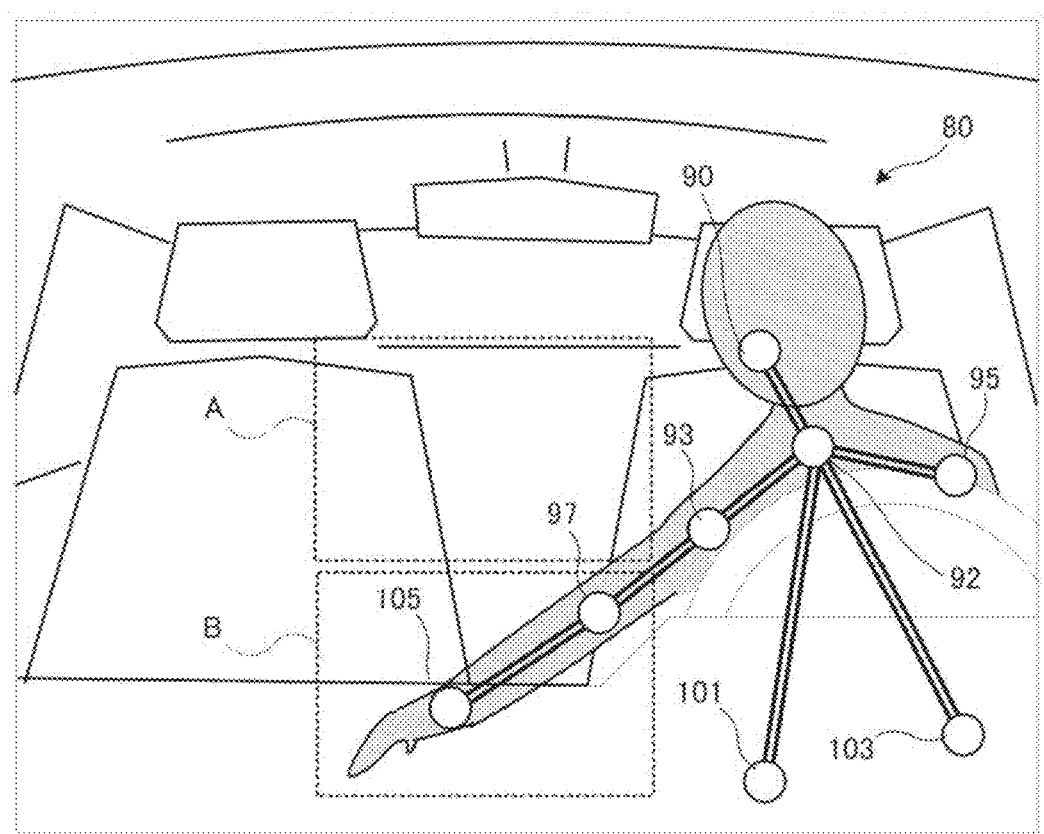
FIG. 5 is an example of image recognition of a driver's sign of stretching his/her arm on a lower side of the front passenger's seat.

FIG. 5 illustrates an example in which the skeleton recognition unit 45 of the illumination control device 5 recognizes the body of the driver 80 using image recognition in a case in which the driver 80 seated in the driver's seat 10 performs a sign of stretching his/her right hand and searching around a lower part of the front passenger's seat 15. In a case in which the skeleton recognition unit 45 recognizes that the right elbow part 97 of the driver 80 has stayed in a predefined second region B for a predetermined second period of time, the determination unit 40 determines to turn on the front foot light 23, and the illumination device control unit 60 performs control to turn on the front foot light 23 included in the illumination device 20. The second region B may be defined as a predetermined region in the image captured by the imaging device 70. The second period of time may be set to, for example, 2 seconds.

It is a matter of course that the determination performed by the determination unit 40 may be made on the basis of motions of a plurality of body parts. Specifically, whether the driver 80 is trying to search around the upper part of the front passenger's seat 15, whether the driver 80 is trying to search around the lower part of the front passenger's seat 15, and the like may be recognized and determined on the basis of motions of the right elbow part 97, the right wrist part 105, and the nose part 90.

[4. Control Operation of Illumination Device]

An operation of controlling the illumination device 20 performed by the illumination control device 5 will be described using the flowcharts illustrated in FIGS. 6 to 13. Each control described in FIGS. 6 to 13 may be performed alone, or a plurality of controls may be combined. It is a matter of course that a combination of an action pattern of each body part of the driver 80 recognized by the skeleton recognition unit 45 and the visual line detecting unit 47 and control is not limited to the combination described in the present embodiment and other various aspects are conceivable.

FIG. 6 is a flowchart for explaining operations of the illumination control device 5. The skeleton recognition unit 45 performs image recognition for a skeleton of a person inside the vehicle 1 from an image acquired using the imaging device 70. Specifically, the skeleton recognition unit 45 performs image recognition for motions of the driver 80 (Step SA1). In a case in which the determination unit 40 determines that the right wrist part 105 of the driver 80 has been in the first region A for the first period of time or more (Step SA2: YES), for example, the determination unit 40 determines to turn on the front reading light 21, and the illumination device control unit 60 controls the illumination device 20 and causes the illumination device 20 to turn on the front reading light 21, on the basis of the determination (Step SA3). The period of time during which the illumination device control unit 60 keeps the front reading light 21 turned on may be limited to, for example, 30 seconds, and the front reading light 21 may then been turned off. In a case in which the determination unit 40 determines that the right wrist part 105 of the driver 80 has not been in the first region A for the first period of time or more (Step SA2: NO), the illumination control device 5 returns to Step SA1.

FIG. 7 is a flowchart for explaining operations of the illumination control device 5. The skeleton recognition unit 45 performs image recognition for a skeleton of a person inside the vehicle 1 from an image acquired using the imaging device 70. Specifically, the skeleton recognition unit 45 performs image recognition for motions of the driver 80 (Step SB1). In a case in which the determination unit 40 determines that the right elbow part 97 of the driver 80 has been in the second region B for the second period of time or more (Step SB2: YES), for example, the determination unit 40 determines to turn on the front foot light 23, and the illumination device control unit 60 controls the illumination device 20 and causes the illumination device 20 to turn on the front foot light 23, on the basis of the determination (Step SB3). The period of time during which the illumination device control unit 60 keeps the front foot light 23 turned on may be limited to, for example, 30 seconds, and the front foot light 23 may then be turned off. In a case in which the determination unit 40 determines that the right elbow part 97 of the driver 80 has not been in the second region B for the second period of time or more (Step SB2: NO), the illumination control device 5 returns to Step SB1.

FIG. 8 is a flowchart for explaining operations of the illumination control device 5. The skeleton recognition unit 45 performs image recognition for a skeleton of a person inside the vehicle 1 from an image acquired using the imaging device 70. Specifically, the skeleton recognition unit 45 performs image recognition for motions of the driver 80 (Step SC1). In a case in which the determination unit 40 determines that the right wrist part 105 of the driver 80 has been in a part behind the front passenger's seat 15 for 3 seconds or more (Step SC2: YES), for example, the determination unit 40 determines to turn on the front passenger's seat-side back reading light 25, and the illumination device control unit 60 controls the illumination device 20 and causes the illumination device 20 to turn on the front passenger's seat-side back reading light 25, on the basis of the determination (Step SC3). The period of time during which the illumination device control unit 60 keeps the front passenger's seat-side back reading light 25 turned on may be limited to, for example, 30 seconds, and the front passenger's seat-side back reading light 25 may then be turned off.

In a case in which the determination unit 40 determines that the right wrist part 105 of the driver 80 has not been in the part behind the front passenger's seat 15 for 3 seconds or more, for example, (Step SC2: NO), the illumination control device 5 returns to Step SC1.

FIG. 9 is a flowchart for explaining operations of the illumination control device 5. The skeleton recognition unit 45 performs image recognition of a skeleton of a person inside the vehicle 1 from an image acquired using the imaging device 70. Specifically, the skeleton recognition unit 45 performs image recognition for motions of the driver 80 (Step SD1). Next, the skeleton recognition unit 45 estimates twist of the body of the driver 80 (Step SD2). Specifically, the skeleton recognition unit 45 estimates the twist of the body of the driver 80 from position information of the shoulder part of the driver 80 and the waist part of the driver 80 obtained from the image acquired by the imaging device 70, and the determination unit 40 determines to turn on and/or off the illumination device 20 on the basis of the twist. The twist may be quantified by an angle formed by a straight line that connects the right shoulder part 93 and the left shoulder part 95 and a straight line that connects the right waist part 101 and the left waist part 103, for example. In a case in which the twist of the body of the driver 80 is equal to or greater than a predetermined value (Step SD3), the illumination control device 5 causes the illumination device control unit 60 to turn on the front passenger's seat-side back reading light 25 (Step SD4). The period of time during which the illumination device control unit 60 keeps the front passenger's seat-side back reading light 25 turned on may be limited to, for example, 30 seconds, and the front passenger's seat-side back reading light 25 may then be turned off. A state in which the twist is a predetermined value means a state in which the angle formed by the straight line that connects the right shoulder part 93 and the straight line that connects the right waist part 101 and the left waist part 103 is 45 degrees, for example. In a case in which the twist of the body of the driver 80 is less than the predetermined value (Step SD3: NO), the illumination control device 5 returns to Step SD1 without turning on the illumination device 20.

FIG. 10 is a flowchart for explaining operations of the illumination control device 5. The skeleton recognition unit 45 performs image recognition for a skeleton of a person inside the vehicle 1 from an image acquired using the imaging device 70. Specifically, the skeleton recognition unit 45 performs image recognition for motions of the driver 80. Next, the action pattern prediction unit 49 predicts a future position of the right wrist part 105 or the right elbow part 97 of the driver 80 (Step SE1). Specifically, for example, on the assumption that the skeleton recognition unit 45 performs image recognition for motions of the driver 80 at every 0.5 seconds, the positions of each body part after 0.5 seconds and 1 second are estimated from the position of each body part at 1.5 seconds before, the position of each body part at 1 second before, the position of each body part at 0.5 seconds before, and the current position of each body part. Next, the determination unit 40 determines whether the predicted position of the right wrist part 105 of the driver 80 or the right elbow part 97 of the driver 80 is equal to or higher than a predetermined height (Step SE2). In a case in which the predicted position is equal to or greater than the predetermined height (Step SE2: YES), the illumination control device 5 performs control such that the illumination device control unit 60 is caused to turn on the driver's seat-side back reading light 27 (Step SE3). The period of time during which the illumination device control unit 60 keeps the driver's seat-side back reading light 27 turned on may be limited to, for example, 30 seconds, and the driver's seat-side back reading light 27 may then be turned off. In a case in which the predicted position is less than the predetermined height (Step SE2: NO), the illumination control device 5 performs control such that the illumination device control unit 60 is caused to turn on the front passenger's seat-side back reading light 25 (Step SE4). The period of time during which the illumination device control unit 60 keeps the front passenger's seat-side back reading light 25 turned on may be limited to, for example, 30 seconds, and the front passenger's seat-side back reading light 25 may then be turned off.

FIG. 11 is a flowchart for explaining operations of the illumination control device 5. The skeleton recognition unit 45 performs image recognition for a skeleton of a person inside the vehicle 1 from an image acquired using the imaging device 70 (Step SF1). Here, the skeleton recognition unit 45 performs image recognition for a face direction of the driver 80. Specifically, the skeleton recognition unit 45 recognizes the face direction in which the face is directed from position information of the right eye 82, position information of the left eye 84, position information of the right ear 86, position information of the left ear 88, position information of the nose part 90, and the like of the driver 80 (Step SF2). The face direction may be defined by an angle formed by a straight line that connects the right ear 86 and the left ear 88 and a straight line that connects the right waist part 101 and the left waist part 103. In a case in which the face of the driver 80 can be recognized, specifically, in a case in which the driver 80 is in a state where the driver 80 is showing his/her face to the imaging device 70 (Step SF3: YES), the determination unit 40 determines whether the face direction of the driver 80 has been in the first range for a third period of time or more (Step SF4). Here, the third period of time is assumed to be, for example, 3 seconds. The state in the first range means a state in which the angle formed by the straight line that connects the right ear 86 and the left ear 88 and the straight line that connects the right waist part 101 and the left waist part 103 is equal to or greater than 90 degrees, for example. In a case in which the determination unit 40 determines that the driver 80 is in the state where the driver 80 is showing his/her face to the imaging device 70 (Step SF4: YES), the illumination control device 5 controls the illumination device 20 using the illumination device control unit 60 and causes the illumination device 20 to turn on the driver's seat-side back reading light 27 (Step SF5). The period of time during which the illumination device control unit 60 keeps the driver's seat-side back reading light 27 turned on may be limited to, for example, 30 seconds, and the driver's seat-side back reading light 27 may then be turned off.

In a case in which the determination unit 40 determines that the face direction of the driver 80 has not been in the first range for the third period of time or more (Step SF4: NO), the illumination control device 5 returns to Step SF1.

In a case in which the face of the driver 80 cannot be recognized, specifically, in a case in which the driver 80 is in a state where the driver 80 is not showing his/her face to the imaging device 70 (Step SF3: NO), the illumination control device 5 controls the illumination device 20 using the illumination device control unit 60 and causes the illumination device 20 to turn on the driver's seat-side back reading light 27 (Step SF5). The period of time during which the illumination device control unit 60 keeps the driver's seat-side back reading light 27 turned on may be limited to, for example, 30 seconds, and the driver's seat-side back reading light 27 may then be turned off.

FIG. 12 s a flowchart for explaining operations of the illumination control device 5. The visual line detecting unit 47 performs image recognition for a visual line direction of a person inside the vehicle 1 from an image acquired using the imaging device 70. Specifically, the visual line detecting unit 47 detects a driver's visual line direction which is a visual line direction of the driver 80 (Step SG1). Next, the determination unit 40 determines whether the driver's visual line is within a predefined second range (Step SG2). Here, the second range is a direction of the back passenger's seat 17 on the side of the driver's seat 10, for example. In a case in which the driver's visual line direction is within the predefined second range (Step SG2: YES), the illumination control device 5 controls the illumination device 20 using the illumination device control unit 60 and causes the illumination device 20 to turn on the driver's seat-side back reading light 27 (Step SG3). The period of time during which the illumination device control unit 60 keeps the driver's seat-side back reading light 27 turned on may be limited to, for example, 30 seconds, and the driver's seat-side back reading light 27 may then be turned off.

In a case in which the driver's visual line direction is not within the predefined second range (Step SG2: NO), the illumination control device 5 returns to Step SG1.

FIG. 13 is a flowchart for explaining operations of the illumination control device 5. The skeleton recognition unit 45 performs image recognition for a skeleton of a person inside the vehicle 1 from an image acquired using the imaging device 70. Specifically, the skeleton recognition unit 45 performs image recognition for motions of the driver 80 (Step SH1). Next, the visual line detecting unit 47 performs image recognition for a visual line direction of the person inside the vehicle 1 from the image acquired using the imaging device 70. Specifically, the visual line detecting unit 47 detects the driver's visual line direction which is a visual line direction of the driver 80 (Step SH2). Then, the determination unit 40 determines whether the driver 80 is stretching his/her arm to the back passenger's seat (Step SH3). Specifically, the determination unit 40 determines whether the right arm of the driver 80 is being stretched in the direction of the back passenger's seat 17 from position information of the right shoulder part 93, position information of the right elbow part 97, and position information of the right wrist part 105 of the driver 80, for example. In a case in which it is determined that the driver 80 is stretching his/her arm to the back passenger's seat 17 (Step SH3: YES), the determination unit 40 determines whether the driver's visual line direction has started to shift to the direction of the back passenger's seat 17 (Step SH4). In a case in which it is determined that the driver's visual line direction has started to shift to the direction of the back passenger's seat 17 (Step SH4: YES), the illumination control device 5 controls the illumination device 20 using the illumination device control unit 60 and causes the illumination device 20 to turn on the driver's seat-side back reading light 27 (Step SH5). The period of time during which the illumination device control unit 60 keeps the driver's seat-side back reading light 27 may be limited to, for example, 30 seconds, and the driver's seat-side back reading light 27 may then be turned off.

In a case in which it is not determined that the driver 80 is stretching his/her arm to the back passenger's seat 17 (Step SH3: NO), the illumination control device 5 returns to Step SH1. In a case in which it is not determined that the driver's visual line direction has started to shift to the direction of the back passenger's seat 17 (Step SH4: NO), the illumination control device 5 returns to Step SH1.

[5. Configuration Supported by Aforementioned Embodiment]

The aforementioned embodiment is a specific example of the following configuration.

(Clause 1) An illumination control device that controls an illumination device illuminating inside of a vehicle, the illumination control device including: an action detecting unit that detects an action pattern that is a body motion of a driver and/or a fellow passenger of the vehicle; and a determination unit that determines, on the basis of the action pattern, whether or not a current situation needs illumination control of the illumination device, in which the illumination device is controlled on the basis of the determination of the determination unit.

According to the illumination control device of Clause 1, control such as turning-on and turning-off of the illumination device inside the vehicle can be executed in accordance with the sign and the visual line direction of the driver inside the vehicle. It is thus possible to improve comfort inside the vehicle.

(Clause 2) The illumination control device according to Clause 1, in which the illumination device is not turned on in a case where the vehicle is moving at a speed that is equal to or greater than a predefined speed.

According to the illumination control device of Clause 2, the illumination device is not turned on in the case in which the vehicle is moving at a speed that is equal to or greater than the predefined speed, and a phenomenon in which it is difficult to see the outside of the vehicle due to the turning-on of the interior illumination device is thus less likely to occur. Therefore, there is an advantage that outside visibility of the driver is less likely to be obscured.

(Clause 3) The illumination device according to Clause 1 or 2, in which the vehicle includes any of a front reading light provided at a front portion inside the vehicle, a front foot light provided at a level of feet at the front portion inside the vehicle, a driver's seat-side back reading light provided at a back passenger's seat on a side of a driver's seat inside the vehicle, and a front passenger's seat-side back reading light provided at the back passenger's seat on a side of a front passenger's seat inside the vehicle.

According to the illumination control device of Clause 3, there is an excellent advantage that illumination lights can be selectively control depending on a sign of the driver even in a case in which the illumination device disposed inside the vehicle includes a plurality of illumination lights.

(Clause 4) The illumination control device according to Clause 3, the action detecting unit includes a skeleton recognition unit that recognizes a skeleton of a person.

According to the illumination control device of Clause 4, it is possible to accurately recognize the sign of the driver through recognition of the skeleton of the person using an image recognition technique, and there is thus an excellent advantage that the illumination control device can accurately execute control such as turning-on and turning-off of the plurality of illumination lights.

(Clause 5) The illumination control device according to Clause 4, in which the action pattern is estimated on the basis of at least any one piece of position information of a shoulder part of the driver, an elbow part of the driver, a wrist part of the driver, a waist part of the driver, and a face part of the driver recognized by the skeleton recognition unit in a time-series manner.

According to the illumination control device of Clause 5, it is possible to capture signs of the driver as features of motions of main body parts of the driver, and there is thus an advantage that the signs can be accurately recognized and control such as turning-on and turning-off of the plurality of illumination lights can be accurately executed.

(Clause 6) The illumination control device according to Clause 5, in which the determination unit determines to turn on the front reading light in a case where the skeleton recognition unit detects that the wrist part of the driver has been in a first region located on an upper side near a center of the vehicle for a predetermined first period of time or more.

According to the illumination control device of Clause 6, it is possible to perform control such that the front reading light illuminating the front passenger's seat is turned on in response to a natural sign of the driver stretching his/her arm to the side of the front passenger's seat and searching for baggage or the like, and there is thus an excellent advantage that the front reading light can be operated without storing any special gestures.

(Clause 7) The illumination control device according to Clause 5 or 6, in which the determination unit determines to turn on the front foot light in a case where the skeleton recognition unit recognizes that the elbow part of the driver has been in a second region located on a lower side near a center of the vehicle for a predetermined second period of time or more.

According to the illumination control device of Clause 7, it is possible to perform control such that the front foot light illuminating the lower part of the front passenger's seat is turned on in response to a natural sign of the driver stretching his/her arm to the lower side of the front passenger's seat and searching for baggage or the like, and there is thus an excellent advantage that the front foot light can be operated without storing any special gestures.

(Clause 8) The illumination control device according to any one of Clauses 5 to 7, in which the determination unit determines to turn on the front passenger's seat-side back reading light in a case in which the skeleton recognition unit recognizes that the wrist part of the driver or the elbow part of the driver has moved to a part behind the front passenger's seat.

According to the illumination control device of Clause 8, it is possible to perform control such that the front passenger's seat-side back reading light illuminating the front passenger's seat-side back passenger's seat is turned on in response to a natural sign of the driver of stretching his/her arm in the direction of the front passenger's seat-side back portion and searching for baggage or the like, and there is thus an advantage that the front passenger's seat-side back reading light can be operated without storing any special gestures.

(Clause 9) The illumination control device according to any one of Clauses 5 to 8, in which the skeleton recognition unit estimates twist of a body of the driver from position information of the shoulder part of the driver and the waist part of the driver, and the determination unit determines, on the basis of the twist, whether or not a current situation needs illumination control of the illumination device.

According to the illumination control device of Clause 9, it is possible to control the illumination device through recognition of the twist of the body of the driver, and the illumination control device can thus accurately distinguish which of the front passenger's seat-side back passenger's seat and the driver's seat-side back passenger's seat the driver is searching around. Therefore, comfort in the vehicle is improved.

(Clause 10) The illumination control device according to Clause 9, in which the determination unit determines to turn on the front passenger's seat-side back reading light in a case where the twist is equal to or greater than a predetermined value.

According to the illumination control device of Clause 10, it is possible to perform control such that the front passenger's seat-side back reading light illuminating the front passenger's seat-side back seat is turned on in response to a natural sign of the driver stretching his/her arm in the direction of the front passenger's seat-side back portion and searching for baggage or the like, and it is thus possible to operate the front passenger's seat-side back reading light without storing any special gestures. Therefore, comfort inside the vehicle is improved.

(Clause 11) The illumination control device according to any one of Clauses 5 to 10 further includes: an action pattern prediction unit that predicts a future action pattern from the action pattern recognized by the skeleton recognition unit in a time-series manner.

According to the illumination control device of Clause 11, it is possible to predict the action pattern in an initial stage of a motion of the driver searching for baggage, and a state in which illumination is turned on has already been achieved when the baggage is actually searching for. Therefore, there is an advantage that the baggage can be smoothly searched for without any waiting time.

(Clause 12) The illumination control device according to Clause 11, in which the determination unit determines to turn on the driver's seat-side back reading light in a case in which a position of the wrist part of the driver or the elbow part of the driver predicted by the action pattern prediction unit is equal to or higher than a predetermined height.

According to the illumination control device of Clause 12, it is possible to perform control such that the driver's seat-side back reading light illuminating the driver's seat-side back seat is turned on in response to an initial stage of a natural sign of the driver stretching his/her arm in the direction of the driver's seat-side back portion and searching for baggage or the like, and it is thus possible to control the driver's seat-side back reading light in an early stage without storing any special gestures. Therefore, comfort inside the vehicle is improved.

(Clause 13) The illumination control device according to Clause 11 or 12, in which the determination unit determines to turn on the front passenger's seat-side back reading light in a case in which a position of the wrist part of the driver or the elbow part of the driver predicted by the action pattern prediction unit is lower than a predetermined height.

According to the illumination control device of Clause 13, it is possible to perform control such that the front passenger's seat-side back reading light illuminating the front passenger's seat-side back seat is turned on in accordance with an initial stage of a natural sign of the driver stretching his/her arm in the direction of the driver's seat-side back portion and searching for baggage or the like, and it is thus possible to control the front passenger's seat-side back reading light in an early stage without storing any special gestures. Therefore, comfort inside the vehicle is improved.

(Clause 14) The illumination control device according to any one of Clauses 5 to 13, in which the skeleton recognition unit recognizes, from position information of a face part of the driver, a face direction that is a direction in which the face of the driver is directed, and the determination unit determines to turn on the driver's seat-side back reading light in a case in which the skeleton recognition unit recognizes that the face direction has been within a predetermined first range for a predetermined third period of time or more or in a case in which the skeleton recognition unit does not recognize the face of the driver.

According to the illumination control device of Clause 14, it is possible to control the driver's seat-side back reading light in accordance with motions of the face of the driver, and it is thus possible to control the illumination device even in a case in which the illumination control device cannot recognize motions of the wrist part and the elbow part. Therefore, comfort inside the vehicle is improved.

(Clause 15) The illumination control device according to Clause 5, in which the action detecting unit includes a visual line detecting unit that detects a visual line of a person.

According to the illumination control device of Clause 15, it is possible to control the illumination device in accordance with the visual line direction rather than motions of the arm parts or the body trunk of the driver. Therefore, comfort inside the vehicle is improved.

(Clause 16) The illumination control device according to Clause 15, in which the visual line detecting unit detects a driver's visual line direction that is a visual line direction of the driver, and the determination unit determines to turn on the driver's seat-side back reading light in a case in which the visual line detecting unit detects that the driver's visual line direction has been within a predetermined second range for a predetermined fourth period of time or more.

According to the illumination control device of Clause 16, it is possible to perform control such that the driver's seat-side back reading light illuminating the driver's seat-side back seat is turned on in accordance with a natural visual line direction of the driver when the driver stretches his/her arm in the direction of the driver's seat-side back portion and searches for baggage or the like, and it is thus possible to operate the driver's seat-side back reading light without storing any special gesture. Therefore, comfort inside the vehicle is improved.

(Clause 17) The illumination control device according to Clause 15 or 16, in which the visual line detecting unit detects a driver's visual line direction that is a visual line direction of the driver, and the determination unit determines to turn on the front passenger's seat-side back reading light or the driver's seat-side back reading light at a timing when the driver's visual line direction starts to shift to a direction of the back passenger's seat in a case in which the skeleton recognition unit recognizes, from the action pattern, that the driver is stretching his/her arm to the back passenger's seat.

According to the illumination control device of Clause 17, it is possible to perform the control such that the driver's seat-side back reading light illuminating the driver's seat-side back seat is turned on in response to an initial stage of a natural sign of the driver directing the visual line to the direction of the driver's seat-side back portion and stretching his/her arm and starting to search for the direction of the driver's seat-side back portion, and it is thus possible to control the driver's seat-side back reading light in an early stage without storing any special gestures. Therefore, comfort inside the vehicle is improved.

As described above, the embodiment has described as an example of the technique disclosed in the present application. However, the technique of the present disclosure is not limited thereto and can also be applied to embodiments with amendments, replacements, additions, omissions, and the like. In addition, new embodiments can also be achieved by combining the components described in the above embodiment.

For example, the step units of the control operations illustrated in FIGS. 6 to 13 are divided in accordance with main processing content for easy understanding of the operations of each part of the illumination control device 5, and the present invention is not limited by how the processing units are divided or how the processing units are called. The step units may be divided into more step units in accordance with processing content. One step unit may be divided to include more processing. In addition, the order of the steps may be appropriately switched without causing any problems in the gist of the present invention.

REFERENCE SIGNS LIST

1 Vehicle
5 Illumination control device
10 Driver's seat
15 Front passenger's seat
17 Back passenger's seat
20 Illumination device
21 Front reading light
23 Front foot light
25 Front passenger's seat-side back reading light
27 Driver's seat-side back reading light
30 Processor
40 Determination unit
43 Action detecting unit
45 Skeleton recognition unit
47 Visual line detecting unit
49 Action pattern prediction unit
50 Storage unit
53 Action pattern storage region
55 Program storage region
60 Illumination device control unit
70 Imaging device
75 Vehicle speed detecting unit
80 Driver
82 Right eye
84 Left eye
86 Right ear
88 Left ear
90 Nose part
92 Neck part
93 Right shoulder part
95 Left shoulder part
97 Right elbow part
99 Left elbow part
101 Right waist part
103 Left waist part
105 Right wrist part
107 Left wrist part
A First region
B Second region

What is claimed is:

1. An illumination control device that controls an illumination device illuminating inside of a vehicle, the illumination control device comprising a processor that includes:
 an action detecting unit that detects an action pattern that is a body motion of a driver and/or a fellow passenger of the vehicle; and
 a determination unit that determines, on the basis of the action pattern, whether or not a current situation needs illumination control of the illumination device,
 wherein
 the illumination device is controlled on the basis of the determination of the determination unit,
 the illumination device includes any of a driver's seat-side back light provided at a back passenger's seat on a side of a driver's seat inside the vehicle and arranged to illuminate the back passenger's seat on the side of the driver's seat inside the vehicle, and a front passenger's seat-side back light provided at the back passenger's seat on a side of a front passenger's seat inside the vehicle and arranged to illuminate the back passenger's seat on the side of the front passenger's seat inside the vehicle, the action detecting unit includes a skeleton recognition unit that recognizes a skeleton of a person, the action pattern is estimated on the basis of position information of a shoulder part of the driver, an elbow part of the driver, and a wrist part of the driver recognized by the skeleton recognition unit in a time-series manner, the action detecting unit includes a visual line detecting unit that detects a visual line of a person, the visual line detecting unit detects a driver's visual line direction that is a visual line direction of the driver, the determination unit
determines from the action pattern whether the driver is stretching his/her arm to the back passenger's seat,
in a case in which it is determined that the driver is stretching his/her arm to the back passenger's seat, determines whether the driver's visual line direction starts to shift to the direction of the back passenger's seat, and
in a case in which it is determined that the driver's visual line direction has started to shift to the direction of the back passenger's seat, determines to turn on the front passenger's seat-side back light or the driver's seat-side back light at a timing when the driver's visual line direction starts to shift to a direction of the back passenger's seat.

2. The illumination control device according to claim 1, wherein the illumination device is not turned on in a case in which the vehicle is moving at a speed that is equal to or greater than a predefined speed.

3. The illumination control device according to claim 1, wherein the illumination device further includes any of a front light provided at a front portion inside the vehicle and arranged to illuminate the front portion inside the vehicle, and a front foot light provided at a level of feet at the front portion inside the vehicle.

4. The illumination control device according to claim 3, wherein the determination unit determines to turn on the front light in a case in which the skeleton recognition unit detects that the wrist part of the driver has been in a first region located on an upper side near a center of the vehicle for a predetermined first period of time or more.

5. The illumination control device according to claim 3, wherein the determination unit determines to turn on the front foot light in a case in which the skeleton recognition unit recognizes that the elbow part of the driver has been in a second region located on a lower side near a center of the vehicle for a predetermined second period of time or more.

6. The illumination control device according to claim 1, wherein the action pattern is estimated on the basis of the position information of the shoulder part of the driver, the elbow part of the driver, and the wrist part of the driver, and on the bases of at least any one piece of position information of a waist part of the driver and a face part of the driver recognized by the skeleton recognition unit in a time-series manner.

7. The illumination control device according to claim 6, wherein the skeleton recognition unit estimates twist of a body of the driver from position information of the shoulder part of the driver and the waist part of the driver, and the determination unit determines, on the basis of the twist, whether or not a current situation needs illumination control of the illumination device.

8. The illumination control device according to claim 6, wherein the skeleton recognition unit recognizes, from position information of a face part of the driver, a face direction that is a direction in which the face of the driver is directed, and
the determination unit determines to turn on the driver's seat-side back light in a case in which the skeleton recognition unit recognizes that the face direction has been within a predetermined first range for a predetermined third period of time or more or in a case in which the skeleton recognition unit does not recognize the face of the driver.

9. The illumination control device according to claim 7, wherein the determination unit determines to turn on the front passenger's seat-side back light in a case in which the twist is equal to or greater than a predetermined value.

10. The illumination control device according to claim 1, wherein the determination unit determines to turn on the front passenger's seat-side back light in a case in which the skeleton recognition unit recognizes that the wrist part of the driver or the elbow part of the driver has moved to a part behind the front passenger's seat.

11. The illumination control device according to claim 1, further comprising:
an action pattern prediction unit that predicts a future action pattern from the action pattern recognized by the skeleton recognition unit in a time-series manner.

12. The illumination control device according to claim 11, wherein the determination unit determines to turn on the driver's seat-side back light in a case in which a position of the wrist part of the driver or the elbow part of the driver predicted by the action pattern prediction unit is equal to or higher than a predetermined height.

13. The illumination control device according to claim 11, wherein the determination unit determines to turn on the front passenger's seat-side back light in a case in which a position of the wrist part of the driver or the elbow part of the driver predicted by the action pattern prediction unit is lower than a predetermined height.

14. The illumination control device according to claim 1, wherein
the determination unit determines to turn on the driver's seat-side back light in a case in which the visual line detecting unit detects that the driver's visual line direction has been within a predetermined second range for a predetermined fourth period of time or more.

* * * * *